United States Patent [19]  [11] 4,167,019
Shepperd  [45] Sep. 4, 1979

[54] VIDEO IMAGE GENERATOR

[75] Inventor: David M. Shepperd, Santa Clara, Calif.

[73] Assignee: Atari, Inc., Sunnyvale, Calif.

[21] Appl. No.: 867,276

[22] Filed: Jan. 5, 1978

[51] Int. Cl.² ............................................. H04N 5/22
[52] U.S. Cl. ...................................... 358/22; 358/104
[58] Field of Search ............................ 358/22, 93, 104

[56] References Cited

U.S. PATENT DOCUMENTS

| 3,836,812 | 9/1974 | Bennett | 358/104 |
| 3,872,244 | 3/1975 | Vaughan-Jones | 358/104 |
| 3,999,308 | 12/1976 | Peters | 358/104 |
| 4,068,847 | 1/1978 | Lukkarila et al. | 358/22 |

Primary Examiner—Richard Murray
Attorney, Agent, or Firm—Townsend and Townsend

[57] ABSTRACT

A video image generator for producing a background image giving the visual appearance of an ocean on a raster type video screen. The image generating circuitry includes means for producing background patterns in successive scan frames of the raster to provide a visual appearance of forward movement. Apparent lateral movement is also provided by shifting the image horizontally. Such visual movement is provided in response to motion control signals associated with video games or the like.

9 Claims, 4 Drawing Figures

VIDEO IMAGE GENERATOR

BACKGROUND OF THE INVENTION

The present invention is directed to a video image generator for use in producing a realistic background video image on a raster type video screen.

Image circuitry for producing pictures of objects or scenery generally includes addressable memories containing picture data. The larger and more complex the object or scene is, the greater the memory space required. Images which depict scenery and which fill a substantial portion of the screen, for example, require considerable memory space if the full image is stored. Such an image is desirable in video games or the like as a background against which other objects can be displayed. It is especially desirable in games to have the background image movable in response to controls operated by the game player, so as to give an illusion of motion. In view of the cost, it is undesirable to provide a large movable background image in video game circuits through direct storage of the full image in memory.

It significantly reduces memory requirements to provide a background image having relatively simple elements which are repeated numerous times to fill the screen. Nevertheless, such images are generally unsatisfactory for providing a realistic background picture. This is particularly true when, in video games, it is desired to depict a continuous and unbroken background image containing the illusion of perspective.

OBJECTS AND SUMMARY OF THE INVENTION

It is an object of the present invention to produce a video background image providing a realistic ocean perspective.

It is another object of the invention to produce such an image which is changeable in response to motion control signals to provide a visual appearance of motion.

Still another object of the invention is to produce such an image with a minimum of memory storage.

Accordingly, apparatus is provided for producing a video background image formed of a plurality of horizontal lines in successsive scan frames with apparent movement provided in response to motion control signals. The apparatus includes pattern generator means for providing a plurality of background patterns which are produced sequentially frame by frame to provide a visual appearance of forward movement. Vertical control means controls the rate at which the background patterns are produced sequentially in response to the motion control signals to change the rate of apparent forward movement.

DESCRIPTION OF THE PREFERRED EMBODIMENT

Figure 1:
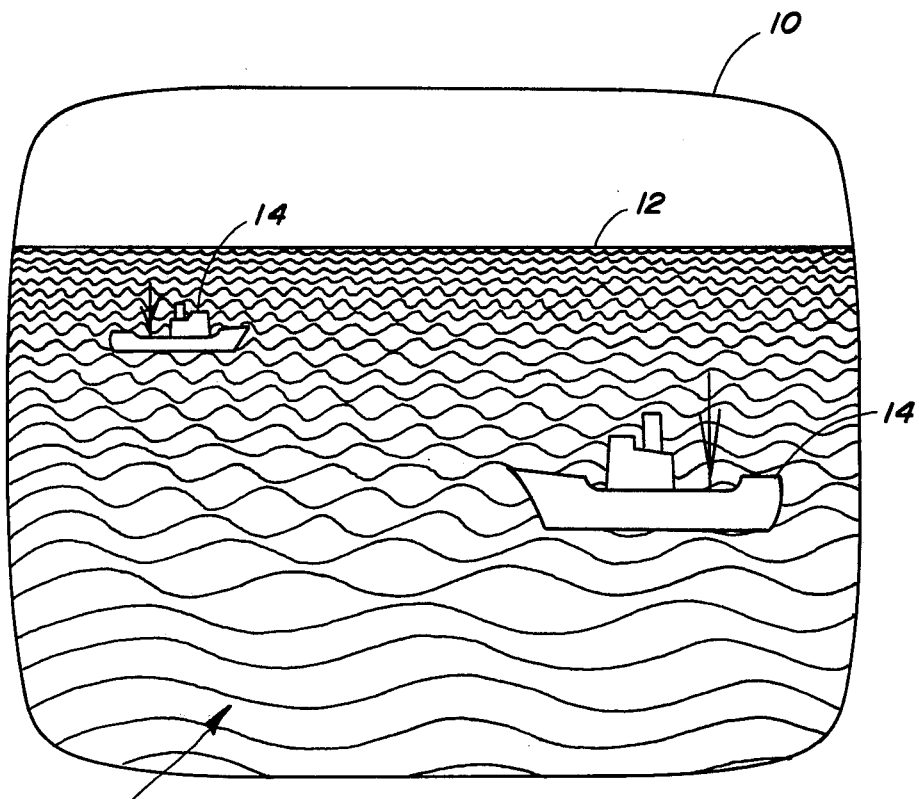
FIG. 1 is a diagramatic view of a video display screen depicting the background image produced by the present invention.

Referring to FIG. 1, the present invention is directed to circuitry for a video game which simulates flight over an ocean. The image of an ocean as seen from an airplane substantially fills screen 10, covering the entire field of view below horizon 12. To simulate flight over the ocean, relative motion is provided in response to player controls. Forward motion can be controlled by a throttle and side motion by a wheel, for example, and the background image moves accordingly. To provide targets, ships 14 are spaced over the ocean background 16. During forward flight the ships appear at horizon 12 and move down and off the screen, gradually increasing in size to simulate perspective. When a player scores a "hit" with a simulated bomb, the ship disappears. The invention is specifically directed to providing the ocean background image 16.

Figure 2:
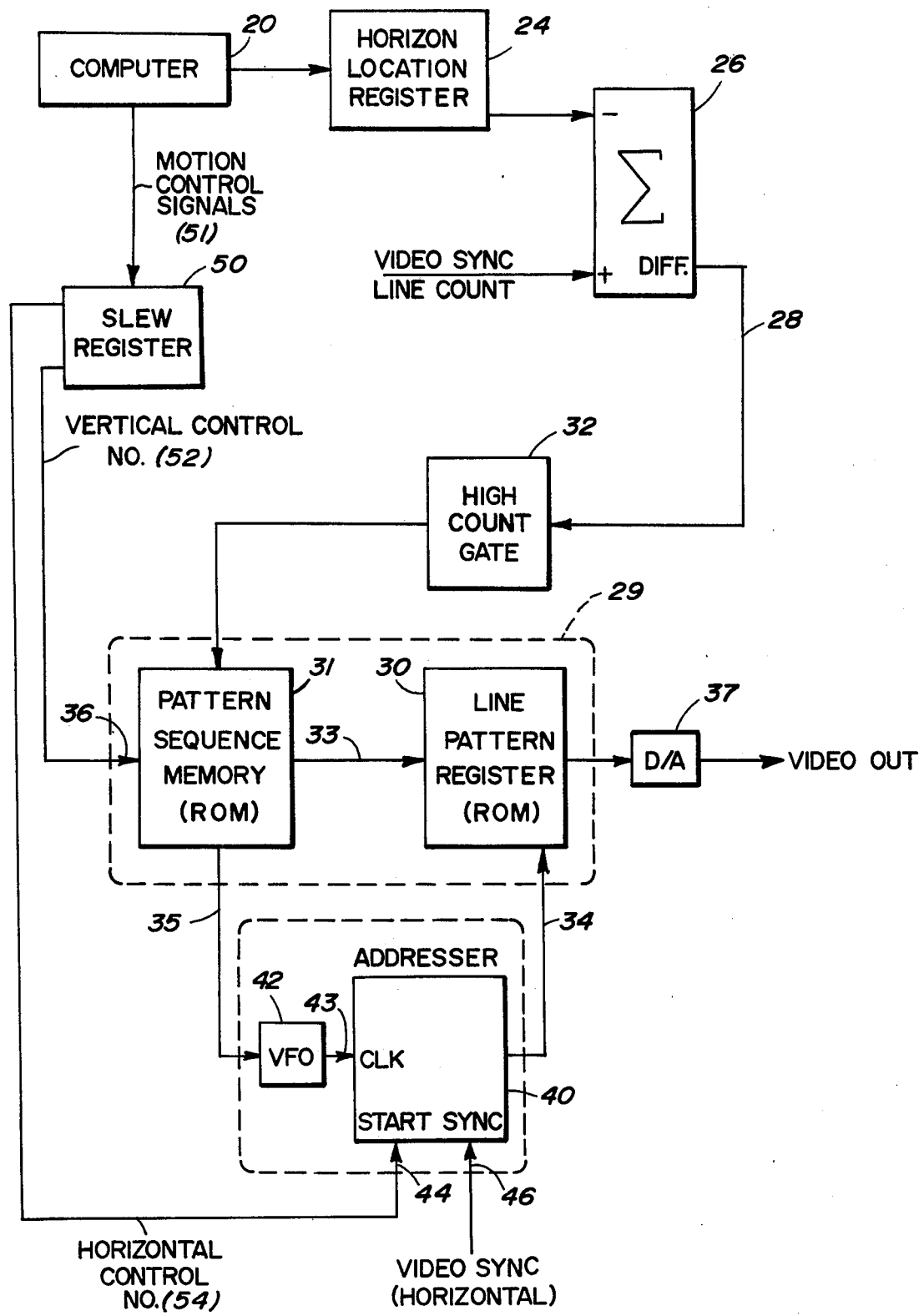
FIG. 2 is a block circuit diagram of the apparatus of the present invention.

Referring to FIG. 2, the circuitry is shown for producing the video image data for ocean background 16 on a raster type video screen. Such screens are well known in the art and provide images formed of a plurality of horizontal lines produced by a moving beam. Each complete scan by the beam is herein referred to as a scan frame and such scan frames are produced with a frequency of sixty frames per second. The game circuitry includes a computer 20, which is the game control microprocessor, receiving manual control input signals from the player by way of the game controls such as the throttle and wheel. Computer 20 also locates and displays the ships 14 and other targets which appear against the background. The computer transmits data locating the horizon 12 in the video sync chain on line 22. This horizon location data is stored in register 24. The number in register 24 identifies the horizontal video line on which the horizon is located. Summing circuit 26 subtracts the number in register 24 from the video sync line count and outputs the difference on line 28. Thus, the number on line 28 becomes 0 at the horizon and increases as each horizontal line of the background is produced on the screen. Line 28 supplies a background line count to pattern generator 29 by way of high count gate 32. Gate 32 transmits the line count carried on line 28 up to a predetermined number and then repeats the highest numbered lines until the scan frame is completed. In the preferred embodiment, gate 32 transmits numbers up to 127 after which the last 16 numbers (112-127) are repeated.

Figure 4:
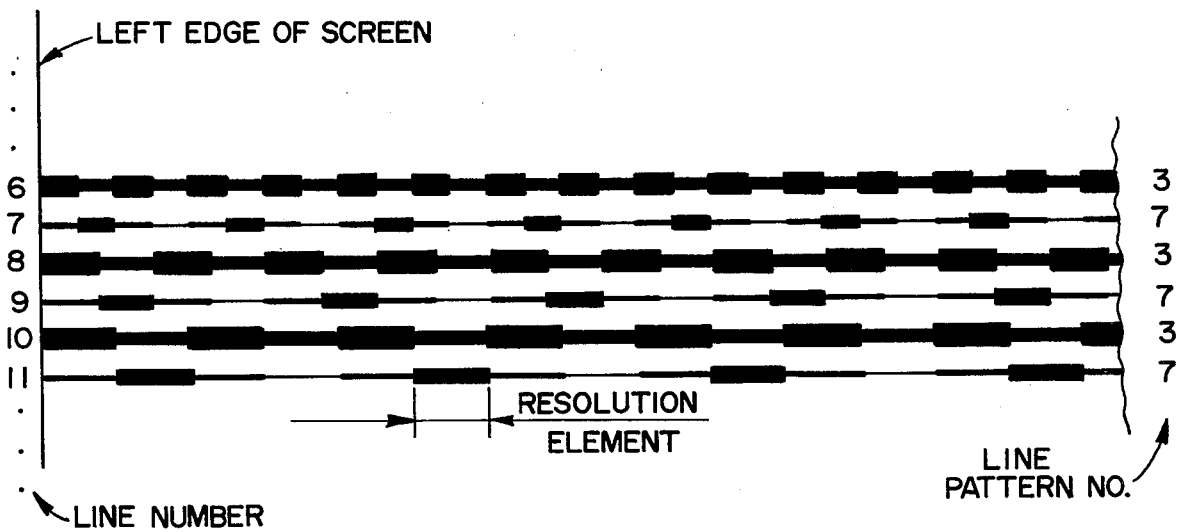
FIG. 4 is a diagramatic view of a portion of a video screen greatly enlarged showing a portion of the background image depicted on FIG. 1.

Pattern generator 29 includes the memory storage for producing the background patterns displayed on screen 10. Each such background pattern is composed of line patterns which form the horizontal lines on the screen. The line patterns are stored in line pattern register 30, which is a read-only memory (ROM). ROM 30 stores a plurality of such line patterns, each providing a repetitive variation of video chrominance and/or luminance. Examples of the patterns of variations produced by the line patterns are shown in FIG. 4, discussed more fully below. In the preferred embodiment, ROM 30 stores 16 different line patterns at addressable locations, with each line pattern including 16 addressable resolution elements containing the chrominance and/or luminance data. In the preferred embodiment, pattern register 30 provides three bits of data corresponding to eight different levels of gray for each resolution element. The data is supplied to digital-to-analog converter 37 which outputs an analog level of gray to the video circuitry. The other memory element in pattern generator 29 is ROM 31, which is a pattern sequence memory for storing four different pattern sequences which select the line patterns in ROM 30. Each of the pattern sequences in ROM 31 provides a line pattern address via line 33 corresponding to each horizontal line of the background image on screen 10. The pattern sequences also provide a frequency control number on line 35 for each horizontal line of the background image. Input 36 receives one of four addresses for determining which of the four pattern sequences is output on lines 33 and 35.

A variable address generator 38 produces a series of resolution element addresses on line 34 to line pattern register (ROM) 30 producing a series of resolution elements such as those in FIG. 4. The variable address generator includes addresser 40 which is a counter outputting a sequence of addresses on line 34 from 0 to 15. Because the line patterns have a predetermined number of resolution elements which are too few to complete a horizontal line, addresser 40 repeats the resolution element addresses until the line is filled. The rate at which these resolution element addresses are supplied is determined by variable frequency oscillator (VFO) 42 which is controlled by the frequency control numbers on line 35. VFO 42 is programmed to provide fifteen different frequency signals on line 43 ranging between 1.5 MHz and 12 MHz. As such, VFO 42 controls the time duration of the repetitive variations of the line patterns on each horizontal line. The first number supplied by addresser 40 on each horizontal line is determined by the number at input 44. Input 46 monitors the video sync signal to determine the beginning of each horizontal line.

Slew register 50 includes both vertical and horizontal control means for controlling the apparent motion on screen 10. The vertical control means supplies a two bit vertical control number 52 to input 36 of pattern sequence memory 31. The horizontal control means supplies a four bit horizontal control number 54 to input 44 of addresser 40. These vertical and horizontal control numbers are selectively indexed between frames of the raster by computer 20 in response to the motion control signals 51 from the player.

Figure 3:
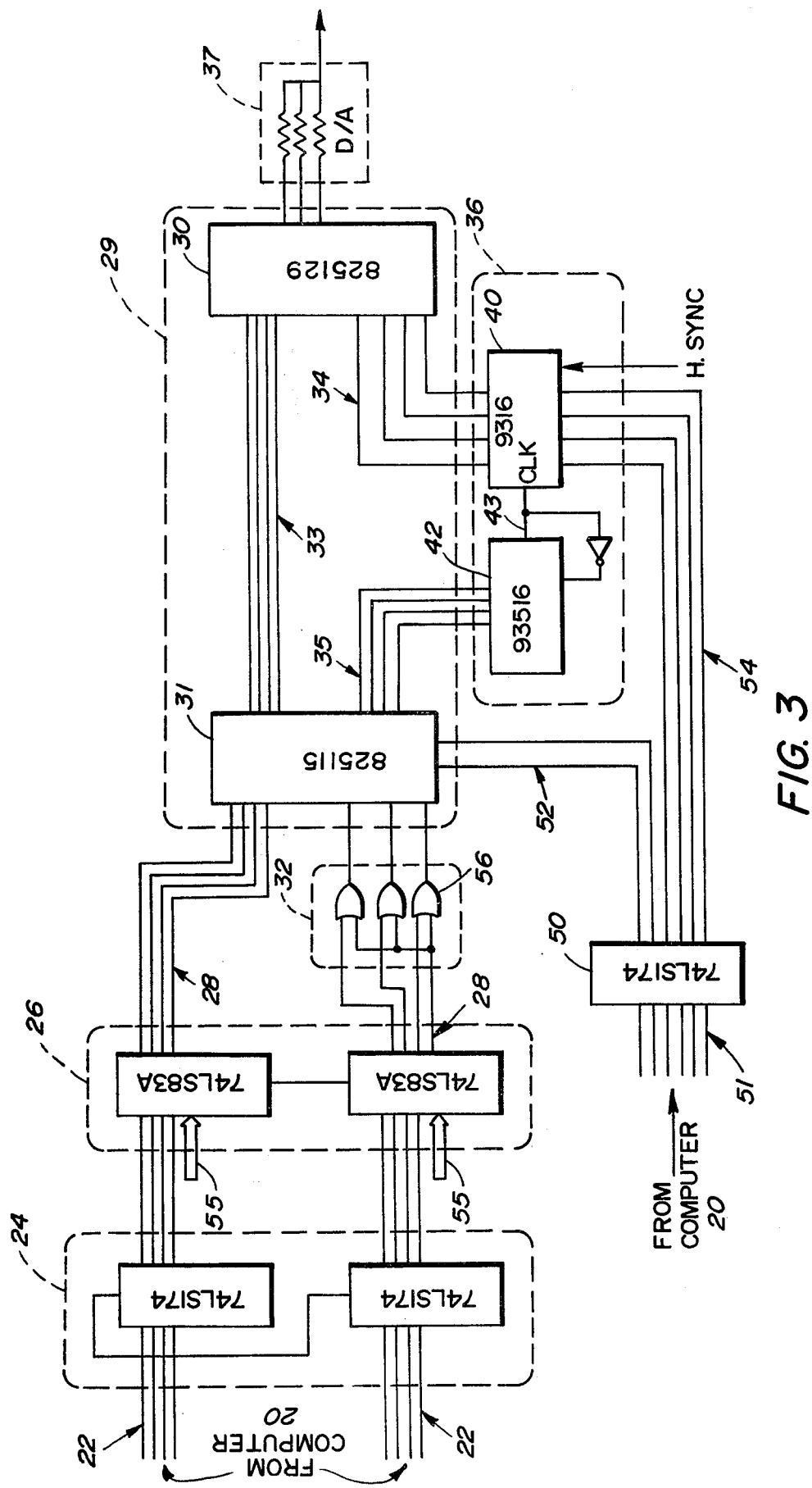
FIG. 3 is a detailed circuit diagram of the apparatus of FIG. 2.

FIG. 3 provides a more detailed disclosure of the circuitry shown in FIG. 2. Horizon location register 24 is an eight bit latch comprising a pair of 74LS174 registers. Data received from computer 20 on line 22 sets the latch. Summing circuit 26 comprises two 74LS83A adders which subtract the number in latch 24 from eight bits of video sync line count data on lines 55 received from the sync chain. The difference is transmitted on line 28 to pattern sequence memory 31, which is an 82S115 programmable read-only memory. High count gate 32 is a plurality of OR gates 56 which repeat addresses 112-127 from adder 26. Line pattern register 30 is an 82S129 programmable read-only memory which receives four bits of data on line 33 from ROM 31 and another four bits on line 34 from the variable address generator 38. Addresser 40 is a 9316 counter having inputs for receiving the four bits of horizontal control number 54 and the H. sync signal as well as a clock input on line 43 from VFO 42. VFO 42 is a 93S16 variable frequency oscillating circuit which receives the four bits of frequency control numbers on line 43. Slew register 50 is a 74LS174 register which receives six bits of motion control information from computer 20 on line 51 and outputs four bits to addresser 40 on line 54 and two bits to ROM 31 on line 52.

In operation, the circuits of FIGS. 2 and 3 provide a video background image formed of a plurality of horizontal lines to provide the appearance of an ocean. The line patterns in register (ROM) 30 produce the horizontal lines which form the background image. ROM 31, addresser 40, and VFO 42 provide the means for selecting and generating the line patterns and for combining them into the background patterns.

As each horizontal line of the scan is produced, adder 26 supplies a background line count on line 28 to ROM 31. Such background count begins with the horizon line. At least one of the line patterns in ROM 30 is a dark solid line which provides the appearance of an ocean horizon. That horizon line pattern is the first addressed by ROM 31. As background lines are counted down on line 28, other line patterns are addressed by the pattern sequences in ROM 31. The pattern sequences select the line patterns in ROM 30 which combine to form a visual image of an ocean. Perspective is provided by the frequency control number supplied for each line by the pattern sequences. The frequency control numbers determine the rate at which the resolution elements are output from ROM 30. VFO 42 and addresser 40 thus together form size control means for controlling the size of the resolution elements on the screen. Size control is accomplished by changing the time duration of the repetitive variations contained in the line patterns relative to the raster scan rate. On lines close to the horizon, the frequency address supplied on line 35 causes VFO 42 to produce a high frequency signal causing relatively small resolution elements and hence small-size variations on the screen. On horizontal lines extending below and away from the horizon the frequency address provides progressively lower frequency signals from VFO 42. The line patterns output from ROM 30 on the lower horizontal lines produce larger image resolution elements and hence larger variations which give a visual appearance of perspective. Thus, with a relatively few line patterns which are selectively combined by means of the pattern sequences, a substantially full screen image of an ocean is provided. It should be kept in mind that the terms top and bottom of the screen refer to the screen as it appears to the viewer and that the perspective effect must be reversed if the screen is viewed through an inverting mirror.

The illusion of forward motion is produced by sequentially employing the four different pattern sequences in pattern sequence memory (ROM) 31. These four different pattern sequences, although each providing the ocean perspective described above, are different enough that when produced successively frame by frame they give a visual appearance of forward movement. The pattern sequence actually employed in any given frame is determined by the vertical control number 52 which is changed sequentially by slew register 50 in response to motion control signals supplied by computer 20. The vertical control means in slew register 50 thereby controls the rate at which different background patterns are produced sequentially. In the preferred embodiment vertical control number 52 is indexed, or increased by one, between approximately every 16 frames to produce the appearance of forward motion at approximately 300 miles per hour. To produce slower speeds, the vertical control number is changed less frequently. Similarly, the frequency is increased for higher speeds.

Means are also provided to produce horizontal movement by horizontally shifting the background patterns produced by pattern generator 29. The starting resolution element of each line pattern in ROM 30 is determined for each horizontal line by the horizontal control number 54. That starting address is changed between scan frames to shift the picture laterally. The change is accomplished by addresser 40 which together with slew register 50 form the horizontal shifting means. Addresser 40 continuously cycles between 0 and 15 as it addresses the sixteen resolution elements of the line patterns in ROM 30. The starting number 54 is changed between frames only when horizontal movement is desired, such as when the player executes a turn. In the preferred embodiment the horizontal control number is changed by at most one number every third or fourth scan frame. The number can be changed more frequently or in larger steps if more rapid turns are desired.

The sixteen line patterns stored in ROM 30 are reproduced in Table 1 below. As noted above, the resolution elements vary between eight different levels of gray. In table 1 the gray values are written in hexadecimals with the eight different levels being 0, 2, 4, 6, 8, A, C and E; 0 being the blackest and E being the whitest.

Table 1

| Line Pattern Address | | | | | | | | | | | | | | | | |
|---|---|---|---|---|---|---|---|---|---|---|---|---|---|---|---|---|
| 0 | 2 | 2 | 2 | 2 | 2 | 2 | 2 | 2 | 2 | 2 | 2 | 2 | 2 | 2 | 2 | 2 |
| 1 | 4 | 4 | 4 | 4 | 4 | 4 | 4 | 4 | 4 | 4 | 4 | 4 | 4 | 4 | 4 | 4 |
| 2 | 6 | 6 | 6 | 6 | 6 | 6 | 6 | 6 | 6 | 6 | 6 | 6 | 6 | 6 | 6 | 6 |
| 3 | 6 | 8 | 6 | 8 | 6 | 8 | 6 | 8 | 6 | 8 | 6 | 8 | 6 | 8 | 6 | 8 |
| 4 | 6 | 6 | 8 | 6 | 6 | 8 | 6 | 6 | 8 | 6 | 6 | 8 | 6 | 6 | 8 | 6 |
| 5 | A | 8 | 6 | 8 | A | 8 | 6 | 8 | A | 8 | 6 | 8 | A | 8 | 6 | 8 |
| 6 | 8 | 8 | A | 8 | 8 | A | 8 | 8 | A | 8 | A | 8 | 8 | A | 8 | 8 |
| 7 | A | 8 | A | C | A | 8 | A | C | A | 8 | A | C | A | 8 | A | C |
| 8 | A | A | C | A | A | C | A | A | C | A | A | C | A | A | C | A |
| 9 | A | A | C | E | C | A | A | C | E | C | A | A | C | E | A | A |
| 10 | 8 | A | C | A | 8 | C | E | C | A | 8 | A | C | E | C | A | 8 |
| 11 | C | A | A | 8 | 8 | A | C | C | E | C | A | A | B | C | C |
| 12 | 6 | 8 | A | C | A | 8 | 6 | 6 | 8 | 8 | A | C | C | A | A | 8 |
| 13 | C | A | A | C | C | A | A | C | C | 8 | C | A | A | C | C | A |
| 14 | A | 8 | 8 | A | A | C | A | 8 | 8 | A | C | C | A | A | 8 | A |
| 15 | 6 | 6 | 4 | 4 | 2 | 2 | 4 | 4 | 6 | 6 | 4 | 4 | 2 | 2 | 4 | 4 |
| Resolution Element Address | 0 | 1 | 2 | 3 | 4 | 5 | 6 | 7 | 8 | 9 | 10 | 11 | 12 | 13 | 14 | 15 |

Note that line patterns 0, 1 and 2 all produce solid lines of differing darkness and that the remainder assume various patterns. As noted above, all the line patterns are adapted to be repeated as many times as necessary to fill a horizontal line.

The pattern sequences stored in pattern sequence memory (ROM) 31 are reproduced in Table 2 below. Note that associated with each background line address there are four number pairs, one for each line sequence. The number pairs are written in hexidecimals with the first number representing the line pattern address supplied to ROM 30 and the second number representing the frequency control number supplied to VFO 42. The frequency control numbers vary between hexidecimal 0 and E, with 0 producing the lowest frequency output from VFO 42, and E the highest.

Table 2

First digit = Line Pattern Address
Second digit = Frequency Control Number

| Background Line Address | Line Sequence 0 | Line Sequence 1 | Line Sequence 2 | Line Sequence 3 |
|---|---|---|---|---|
| 0 | 1E | 1E | 1E | 1E |
| 1 | 1E | 1E | 1E | 1E |
| 2 | 2E | 2E | 2E | 2E |
| 3 | 2E | 2E | 2E | 2E |
| 4 | 2E | 2E | 2E | 2E |
| 5 | 4E | 1E | 4E | 7D |
| 6 | 4E | 4E | 5E | 3C |
| 7 | 2E | 3E | 1E | 7C |
| 8 | 6E | 7E | 5E | 3B |
| 9 | 4E | 3D | 1C | 7B |
| 10 | 5E | 7D | 5E | 3A |
| 11 | 1D | 3C | 1B | 7A |
| 12 | 5D | 7C | 5B | 39 |
| 13 | 1C | 3B | 1A | 79 |
| 14 | 5C | 7B | 5A | 38 |
| 15 | 1B | 3A | 19 | 78 |
| 16 | 5B | 7A | 59 | 37 |
| 17 | 1A | 39 | 18 | 77 |
| 18 | 5A | 79 | 58 | 26 |
| 19 | 19 | 38 | 17 | 56 |
| 20 | 59 | 78 | 57 | 5A |
| 21 | 18 | 37 | 4E | 19 |
| 22 | 58 | 77 | 3E | 59 |
| 23 | 17 | 26 | 7E | 18 |
| 24 | 57 | 56 | 3D | 58 |
| 25 | 4C | 4C | 6C | 7C |
| 26 | 5C | 5C | 6C | 7C |
| 27 | 5C | 4C | 6C | 7C |
| 28 | 5C | 5C | 6C | 7C |
| 29 | 5C | 6C | 6C | 7C |
| 30 | 4C | 6C | 7C | 7C |
| 31 | 5C | 6C | 6C | 8C |
| 32 | 4B | 6B | 5B | 8B |
| 33 | 5B | 5B | 6B | 6B |
| 34 | 6B | 5B | 6B | 6B |
| 35 | 6B | 6B | 7B | 7B |
| 36 | 6B | 6B | 7B | 7B |
| 37 | 5B | 6B | 7B | 8B |
| 38 | 5A | 6A | 7A | 8A |
| 39 | 6A | 7A | 7A | 9A |
| 40 | 6A | 6A | 6A | 9A |
| 41 | 6A | 5A | 6A | 9A |
| 42 | 7A | 6A | 7A | 8A |
| 43 | 6A | 6A | 7A | 8A |
| 44 | 6A | 7A | 8A | 7A |
| 45 | 5A | 7A | 6A | 7A |
| 46 | 69 | 79 | 69 | 79 |
| 47 | 69 | 79 | 69 | 89 |
| 48 | 79 | 69 | 69 | 89 |
| 49 | 79 | 69 | 79 | 89 |

Table 2-continued

First digit = Line Pattern Address  
Second digit = Frequency Control Number

| Background Line Address | Line Sequence 0 | Line Sequence 1 | Line Sequence 2 | Line Sequence 3 |
|---|---|---|---|---|
| 50 | 79 | 79 | 79 | 99 |
| 51 | 69 | 79 | 79 | 99 |
| 52 | 69 | 89 | 89 | 99 |
| 53 | 78 | 88 | 88 | 98 |
| 54 | 78 | 68 | 88 | 88 |
| 55 | 78 | 68 | 98 | 88 |
| 56 | 88 | 68 | 98 | 94 |
| 57 | 88 | 68 | 98 | 98 |
| 58 | 78 | 78 | 88 | A8 |
| 59 | 79 | 78 | 88 | A8 |
| 60 | 67 | 77 | 87 | A7 |
| 61 | 67 | 77 | 77 | 97 |
| 62 | 67 | 87 | 77 | 97 |
| 63 | 67 | 87 | 87 | A7 |
| 64 | 77 | 87 | 87 | A7 |
| 65 | 77 | 87 | 87 | B7 |
| 66 | 77 | 97 | 97 | B7 |
| 67 | 87 | 97 | 97 | B7 |
| 68 | 87 | 87 | 97 | A7 |
| 69 | 87 | 87 | 97 | A7 |
| 70 | 96 | 86 | 86 | A6 |
| 71 | 96 | 86 | 86 | C6 |
| 72 | 86 | 76 | 96 | C6 |
| 73 | 86 | 76 | 96 | B6 |
| 74 | 86 | 86 | 96 | C6 |
| 75 | 86 | 96 | A6 | B6 |
| 76 | 76 | 86 | A6 | A6 |
| 77 | 76 | 96 | A6 | A6 |
| 78 | 86 | 96 | 96 | B6 |
| 79 | 85 | 95 | 95 | B5 |
| 80 | 85 | 95 | A5 | C5 |
| 81 | 95 | 85 | A5 | C5 |
| 82 | 95 | 85 | A5 | D5 |
| 83 | 95 | 95 | B5 | D5 |
| 84 | 95 | 95 | B5 | C5 |
| 85 | 85 | 95 | B5 | C5 |
| 86 | 85 | A5 | A5 | C5 |
| 87 | 95 | A5 | A5 | E5 |
| 88 | 94 | A4 | A4 | E4 |
| 89 | A4 | 94 | C4 | E4 |
| 90 | A4 | 94 | C4 | C4 |
| 91 | 94 | A4 | B4 | C4 |
| 92 | 94 | A4 | C4 | B4 |
| 93 | A4 | A4 | B4 | A4 |
| 94 | A4 | B4 | A4 | A4 |
| 95 | A3 | B3 | A3 | A3 |
| 96 | A3 | B3 | B3 | C3 |
| 97 | B3 | A3 | B3 | C3 |
| 98 | B3 | A3 | B3 | E3 |
| 99 | B3 | C3 | C3 | C3 |
| 100 | A3 | C3 | C3 | B3 |
| 101 | A3 | C3 | D3 | B3 |
| 102 | B3 | B3 | D3 | A3 |
| 103 | B2 | C2 | D2 | A2 |
| 104 | C2 | B2 | C2 | B2 |
| 105 | C2 | A2 | C2 | C2 |
| 106 | B2 | A2 | E2 | C2 |
| 107 | B2 | B2 | E2 | E2 |
| 108 | B2 | B2 | C2 | E2 |
| 109 | A2 | B2 | C2 | C2 |
| 110 | C2 | A2 | B2 | C2 |
| 111 | B2 | C2 | A2 | D2 |
| 112 | C1 | D1 | A1 | D1 |
| 113 | C1 | D1 | C1 | D1 |
| 114 | C1 | D1 | C1 | E1 |
| 115 | D1 | C1 | E1 | E1 |
| 116 | D1 | C1 | C1 | D1 |
| 117 | C1 | E1 | B1 | D1 |
| 118 | C1 | E1 | B1 | C1 |
| 119 | E0 | C0 | A0 | C0 |
| 120 | E0 | C0 | A0 | B0 |
| 121 | C0 | B0 | B0 | B0 |
| 122 | C0 | A0 | C0 | A0 |
| 123 | B0 | A0 | C0 | A0 |
| 124 | A0 | C0 | E0 | B0 |
| 125 | B0 | C0 | D0 | B0 |
| 126 | C0 | E0 | C0 | C0 |
| 127 | E0 | C0 | E0 | D0 |

As noted above, the background line addresses 112–127 are repeated on higher numbered horizontal lines of the background image to complete the scan. This is done to save memory and because there is no significant impairment of the resultant background image.

As an example of the visual image produced by the various resolution elements, FIG. 4 provides a view, greatly enlarged, of a portion of a video screen on which a background image is displayed. In the example shown, background lines 6–11 are shown for pattern sequence number 3. Referring to Table 2, the particular line patterns addressed are 3 and 7 with the frequency decreasing from C on background line 6 to A on background line 11. In FIG. 4, the width of each resolution element represents the level of blackness. All the lines shown begin with the same resolution element, as determined by horizontal control number 54. If, during a subsequent scan frame on which the same line sequence is produced, the horizontal control number is increased by 1, each horizontal line shown in FIG. 3 will be moved to the left by one resolution element. The actual distance the line is moved depends on the width of the resolution element as determined by the frequency address. Thus, the lower lines are shifted a greater amount, which corresponds with the desired provision of an illusion of perspective.

The circuitry of the present invention provides a relatively large video display with a small amount of memory. The background image produced includes realistic perspective and simulates flying over an ocean. Furthermore, the invention provides for player-controlled motion relative to this large background image.

Alternative embodiments of the background image generator of this invention include the use of larger numbers of line patterns each of which could include more resolution elements. The number of pattern sequences could also be increased if a larger capacity memory is provided. Alternatively, as few as three pattern sequences could be used and still provide the illusion of forward movement. The line patterns could include chromatic variations if a color video raster is used. Although particularly adapted to an ocean background, the invention is not limited to such a background image.

Apparatus has been provided to produce a video background image giving a realistic ocean perspective. The invention produces such an image which is changeable in response to motion control signals. Furthermore, the background image is produced with a minimum of memory storage.

What is claimed is:

1. Apparatus for producing a video background image formed of a plurality of raster-oriented horizontal lines in successive scan frames with apparent motion provided in response to motion control signals comprising:

pattern generator means for providing a plurality of background patterns which are produced sequentially frame by frame to provide a visual appearance of forward movement, said pattern generator means including a line pattern memory for storing at addressable locations line patterns for producing said horizontal lines to form said background patterns, and a pattern sequence memory coupled to said line pattern memory for storing a plurality of pattern sequences which select said line patterns in said line pattern memory to produce said background patterns, each said pattern sequence providing a line pattern address for each said horizontal line of said background image, and vertical control means coupled to said pattern sequence memory and responsive to said motion control signals for selecting a one of said stored plurality of pattern sequences and for controlling the rate of selection of said stored pattern sequences whereby said background patterns are produced sequentially to change the rate of apparent forward movement.

2. Apparatus as in claim 1 further comprising means for horizontally shifting said background patterns produced by said pattern generator means in response to said motion control signals to provide a visual appearance of movement to the side.

3. Apparatus as in claim 1 in which said pattern sequence memory stores at least three of said pattern sequences corresponding to at least three different background patterns, said pattern sequence memory being responsive to said vertical control means for providing sequentially said pattern sequences whereby said apparent forward motion is produced.

4. Apparatus as in claim 1 in which each of said line patterns in said line pattern memory includes a predetermined number of resolution elements, and including means for producing a series of said resolution elements of said selected line pattern for each said horizontal line and for repeating said series of resolution elements to complete each said horizontal line.

5. Apparatus as in claim 4 in which said pattern sequences of said pattern sequence memory provide a frequency control number for each said horizontal line of said background image for determining the rate at which said resolution elements are output from said line pattern memory, whereby said frequency control number controls the image size of said individual resolution elements along said horizontal line.

6. Apparatus as in claim 5 in which at least one of said line patterns provides the appearance of an ocean horizon, said pattern sequences selecting said at least one line pattern which is said horizon to be produced on a predetermined horizontal line and having a frequency control number for producing small image resolution elements on horizontal lines adjacent said predetermined line, said pattern sequences including frequency control numbers for producing progressively larger image resolution elements on said horizontal lines appearing below said horizon to provide a visual appearance of perspective.

7. Apparatus as in claim 4 in which said resolution elements of said line patterns are addressable, said means for producing a series of said resolution elements including a variable address generator for producing a repeating series of said resolution element addresses, and including horizontal control means responsive to said motion control signals for determining the resolution element initially addressed by said variable address generator on each said horizontal line during a scan frame whereby changes in the starting resolution element between frames provides a visual appearance of movement to the side.

8. Apparatus as in claim 7 in which the size of the image produced by each said resolution element depends on the rate at which said resolution elements are addressed by said variable address generator, and said pattern sequences provide a frequency control number to said variable address generator corresponding to each said horizontal line of said background image for determining said rate at which said resolution elements are addressed by said variable address generator whereby said frequency control number controls image size of said individual resolution elements.

9. Apparatus for producing a video background image on a display screen of the type having an image-forming beam that traverses said screen to form a plurality of successive horizontal lines and for providing said video background image with a visual appearance of perspective comprising:

means for storing a plurality of line patterns for providing repetitive variations of video chrominance and/or luminance, means for selecting at least one of said line patterns for each said horizontal line, means for generating said selected line patterns for each of said horizontal lines, and size control means for controlling the time duration of said repetitive variation for each of said horizontal lines, said size control means providing smaller variations on horizontal lines appearing nearest the top of the background image and progressively larger variations on the horizontal lines appearing below said top line to provide a visual appearance of perspective.

* * * * *